United States Patent [19]
Jourdan et al.

[11] Patent Number: 5,978,129
[45] Date of Patent: Nov. 2, 1999

[54] WAVELENGTH CONVERTER FOR BINARY OPTICAL SIGNALS

[75] Inventors: Amaury Jourdan, Sevres; Guy Soulage, Vitry S/ Seine; Jean-claude Jacquinot, Le Kremlin Bicetre; Michel Sotom, Paris, all of France

[73] Assignee: Alcatel, Paris, France

[21] Appl. No.: 09/021,997

[22] Filed: Feb. 11, 1998

[30] Foreign Application Priority Data

Feb. 14, 1997 [FR] France .................................. 97 01767

[51] Int. Cl.⁶ .................................................. G02F 1/35
[52] U.S. Cl. ................................... 359/326; 359/332
[58] Field of Search .................... 359/326–332; 385/122

[56] References Cited

U.S. PATENT DOCUMENTS

| | | | |
|---|---|---|---|
| 5,619,368 | 4/1997 | Swanson | 359/326 |
| 5,673,140 | 9/1997 | Fisher | 359/332 |
| 5,903,384 | 5/1999 | Bülow | 359/332 |

OTHER PUBLICATIONS

C. Jorgensen et al, "Wavelength Conversion by Optimized Monolithic Integrated Mach–Zehnder Interferometer", *IEEE Photonics Technology Letters*, vol. 8, No. 4, Apr. 1, 1996, pp. 521–523.

*Primary Examiner*—John D. Lee
*Attorney, Agent, or Firm*—Sughrue, Mion, Zinn, Macpeak & Seas, PLLC

[57] ABSTRACT

The invention relates to a wavelength converter including an interferometer structure for delivering an output optical signal, in which converter a first branch contains a first semiconductor optical amplifier and a second branch contains a second semiconductor optical amplifier, the amplifiers being coupled to a common probe laser, and said first amplifier being organized to receive a modulating input signal, said converter including regulator means for acting on the total optical power delivered to said amplifier in response to a negative feedback signal representative of the extinction ratio of the output signal. The invention is applicable to making routing systems using wavelength-division multiplexing.

10 Claims, 6 Drawing Sheets

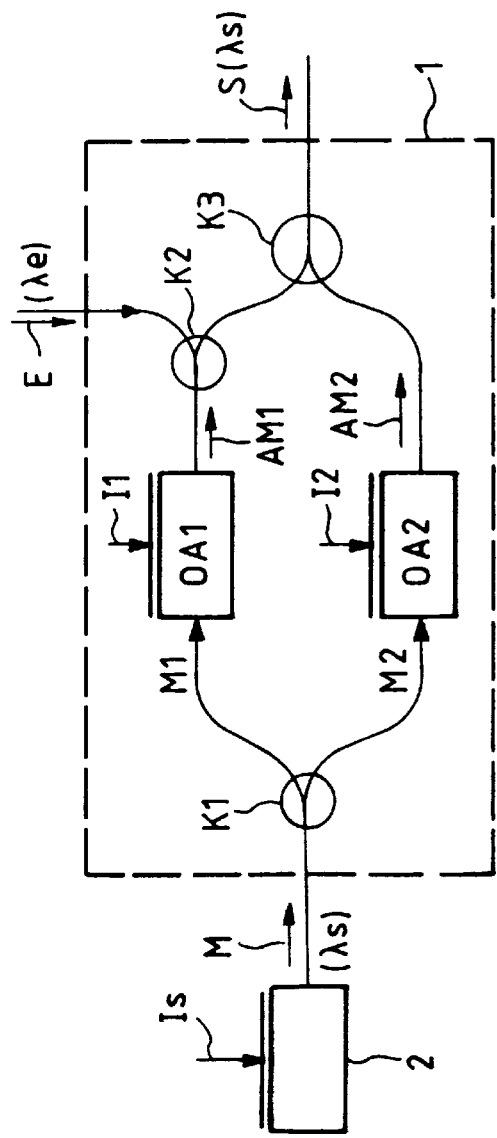
FIG_1
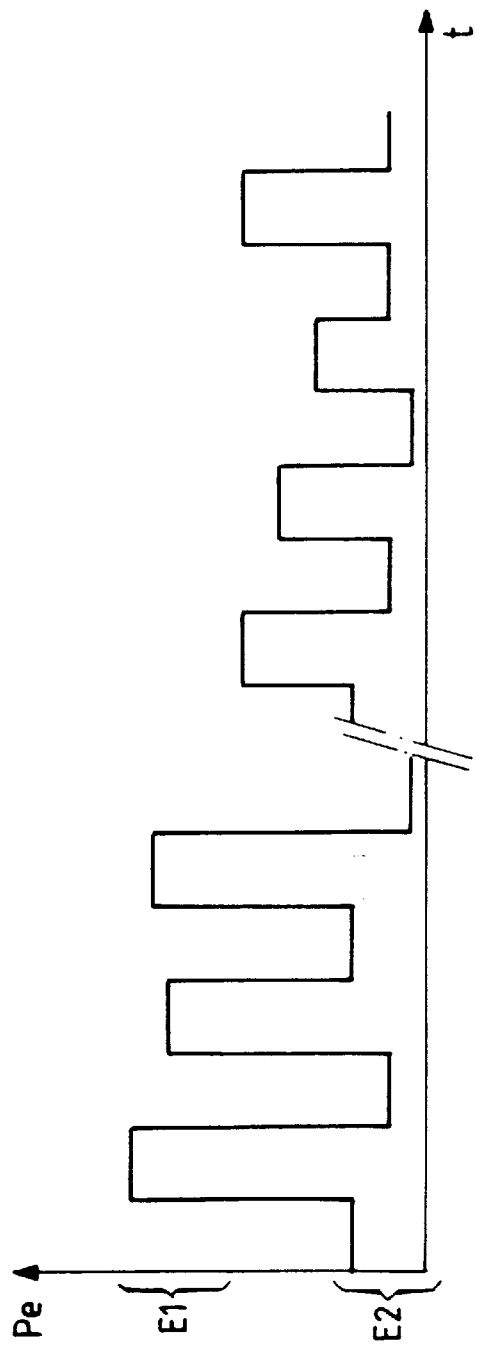
FIG_2

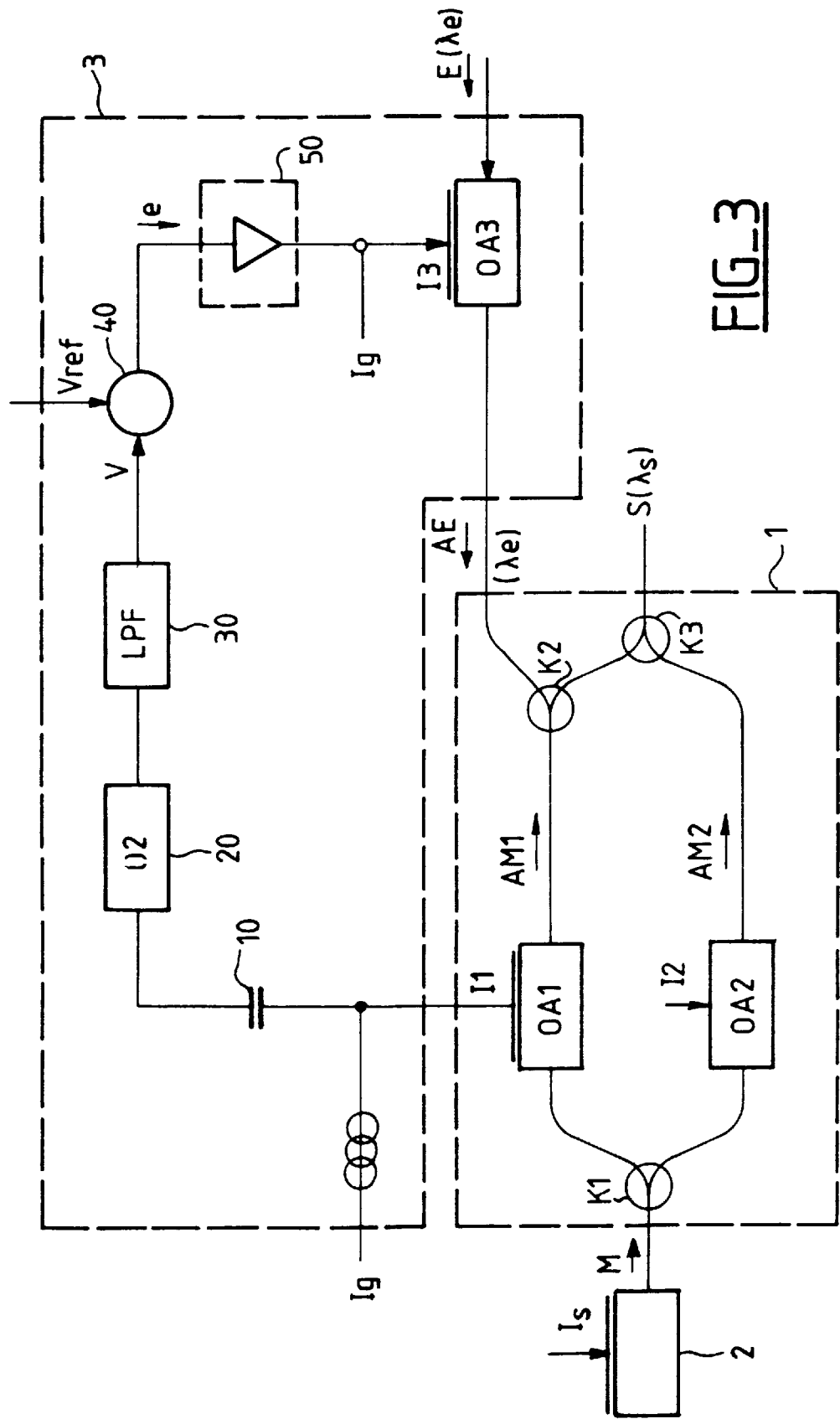
FIG_3

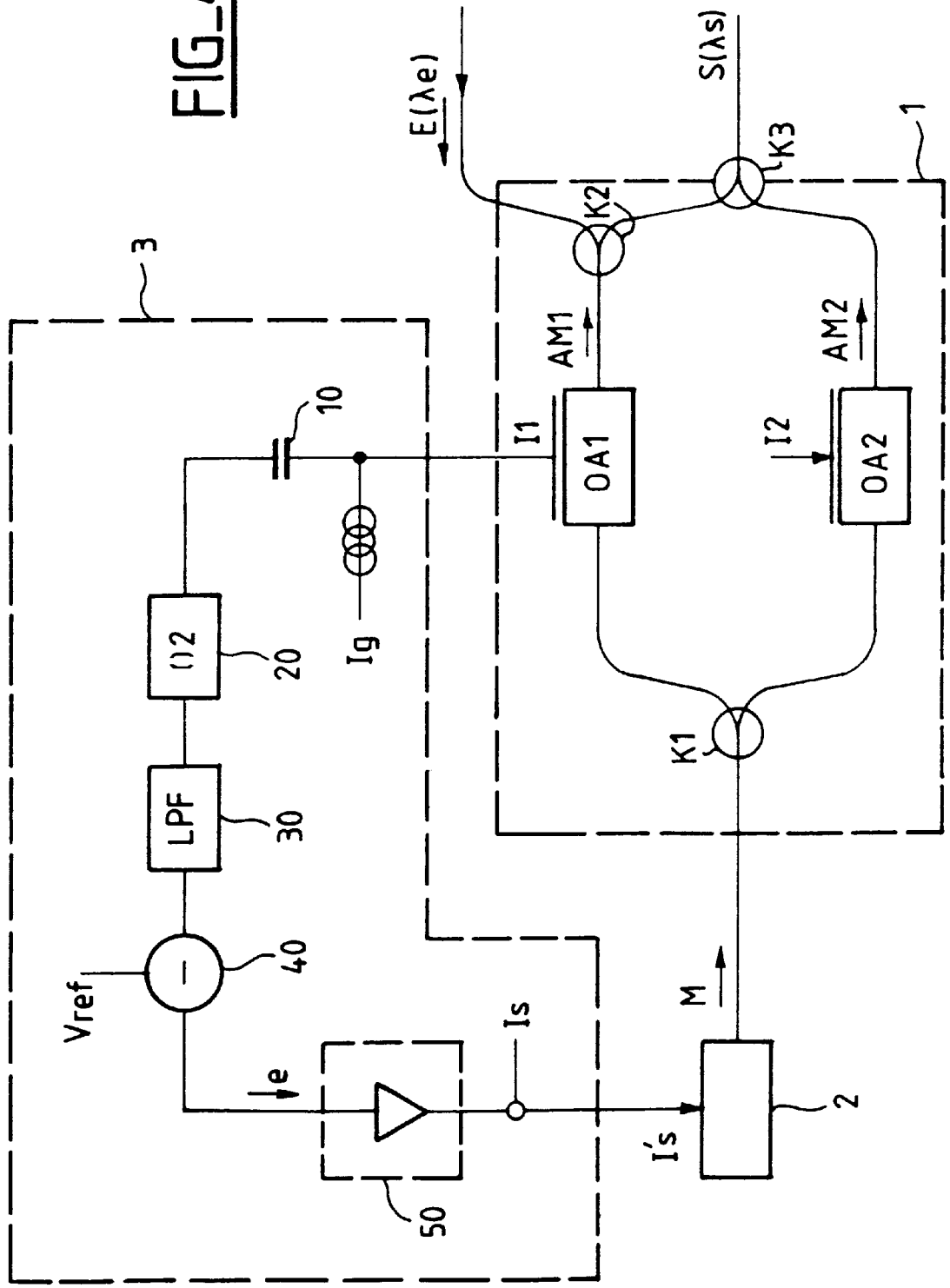
FIG_4

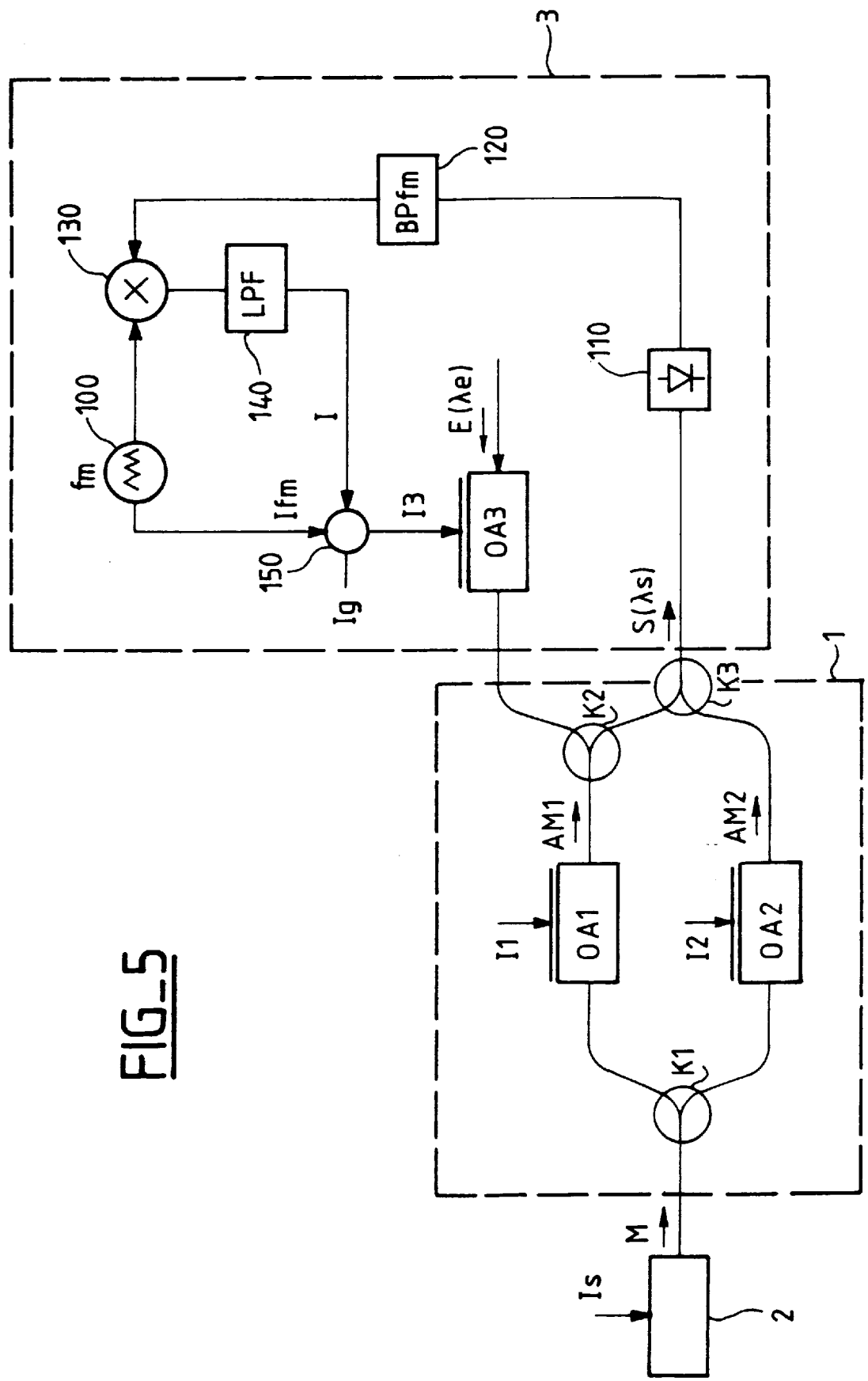
FIG_5

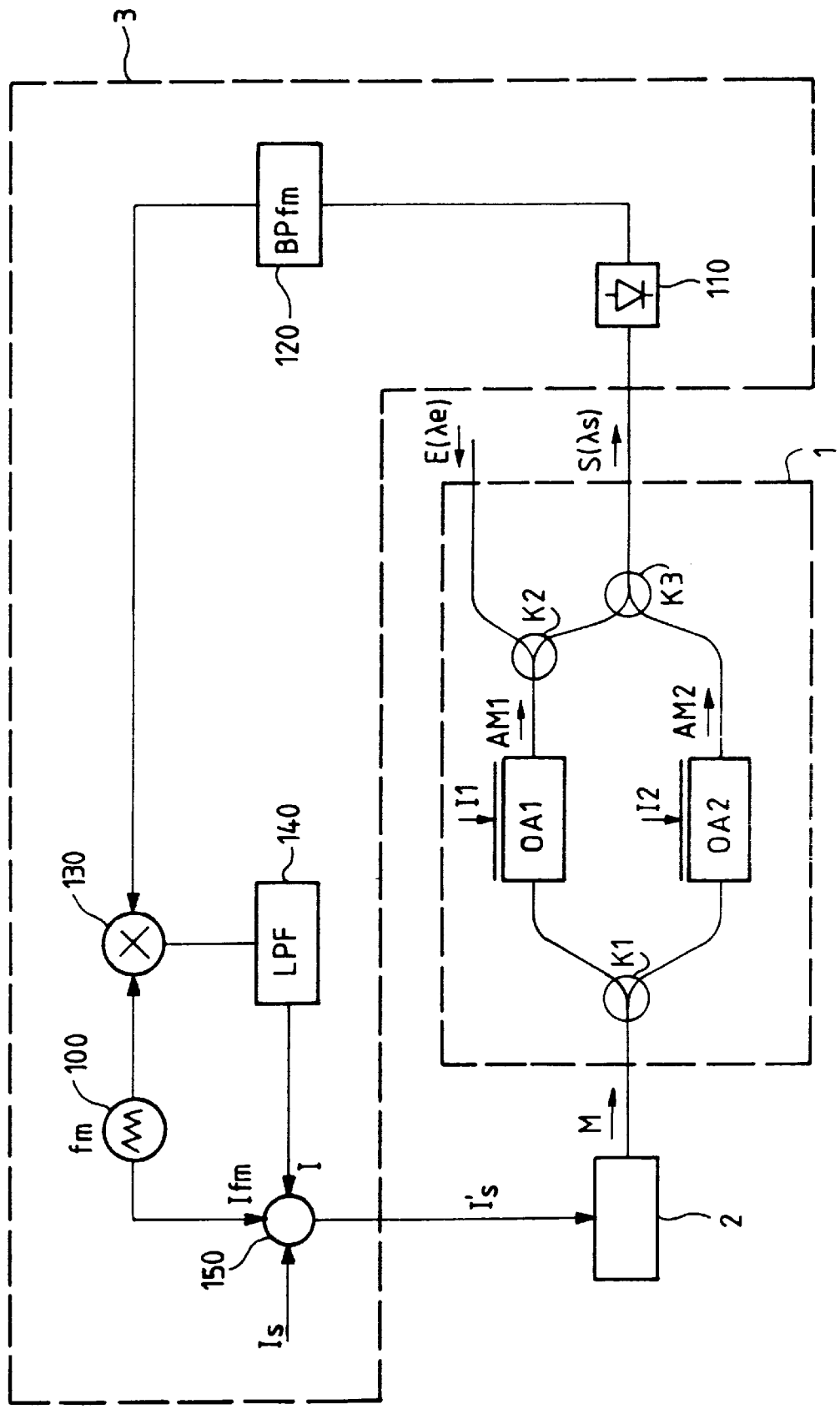

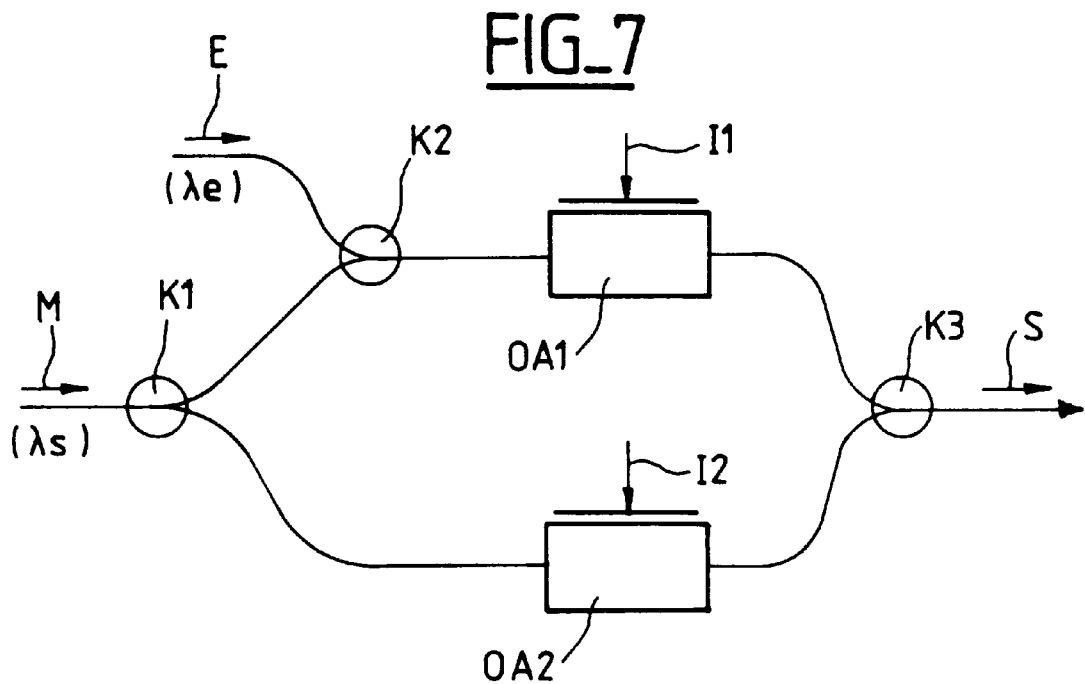
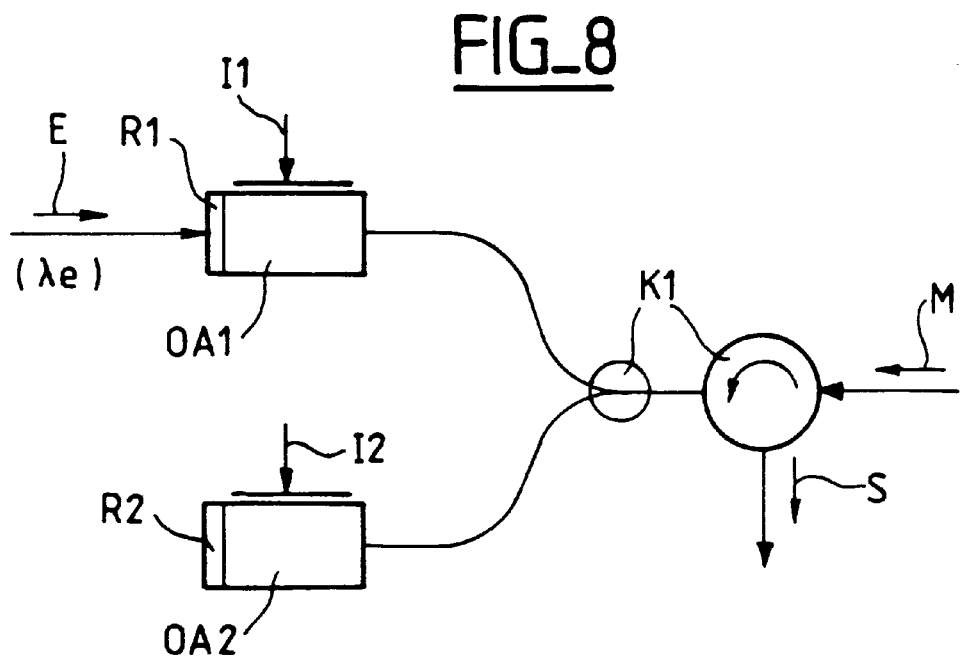

WAVELENGTH CONVERTER FOR BINARY OPTICAL SIGNALS

The invention relates to optoelectronic systems used for processing or transmitting digital data optically.

BACKGROUND OF THE INVENTION

In such systems, the information is often in the form of binary data represented by pulses modulating an optical carrier wave. A binary value is thus determined as a function of the amplitude (or power) level of the modulated optical wave.

During transmission, the signal can be subjected to degradation that makes it more difficult for receivers to detect the high levels and the low levels of the received signal.

In the amplitude domain, the quality of an optical signal is usually defined by two parameters: the signal-to-noise ratio and the extinction ratio.

The signal-to-noise ratio is defined as the ratio of the optical power of the signal to the noise power in a wavelength band including the wavelength of the carrier of the signal.

The extinction ratio is defined as the ratio of the power corresponding to the high level of the signal divided by the power corresponding to the low level of the signal. This ratio must be high enough in spite of variations in the input signal.

Optical signal wavelength converters are used in telecommunications to convert the transmitted optical signal from one wavelength to another wavelength while retaining signal performance.

Such changes in wavelength are used in particular when routing the signals to solve problems of conflict.

Thus, a converter must be capable of using a poor-quality modulated input signal to deliver an output signal whose high levels are stabilized to a constant optical power, and whose low levels have almost zero power, while also having high signal-to-noise ratio.

One possible solution for increasing the extinction ratio when making wavelength converters consists in using an interferometer structure of the Mach-Zehnder type or of an equivalent type.

Such a structure is shown in FIG. 1 and is made up of two branches conveying two coherent waves coupled together to form the output signal. One of the branches comprises a medium whose refractive index varies as a function of the optical power that it conveys, and an input signal is fed into this branch. Variations in the power of the input signal then modulate the refractive index, and the two waves interfere either destructively or constructively as a function of the power level of the input signal.

Such a structure does indeed make it possible to improve the extinction ratio, but it suffers from the drawback that the conditions for destructive and constructive interference are very restrictive on the input signal, in particular with respect to its wavelength, its power level in the high state, and its polarization.

Operation of wavelength converters based on Mach-Zehnder type interferometer structures having semiconductor optical amplifiers is thus very sensitive to fluctuations in those parameters.

OBJECTS AND SUMMARY OF THE INVENTION

An object of the invention is to remedy those drawbacks. A particular object of the invention is to provide a wavelength converter that is transparent to the data rate and to the protocol of the signal being processed, and that procures a high extinction ratio, in other words that offers an output signal (converted signal) of a quality that is not adversely affected by variations in the optical characteristics (wavelength, optical power, polarization) of the input signal.

An object of the present invention is to provide a wavelength converter which includes regulator means that stabilize operating conditions and that can be integrated in an interferometer structure of the Mach-Zehnder type or of an equivalent type.

More precisely, the invention provides a wavelength converter including an interferometer structure for delivering an output optical signal, in which converter a first branch contains a first semiconductor optical amplifier and a second branch contains a second semiconductor optical amplifier, the amplifiers being coupled to a common probe laser, and said first amplifier being organized to receive a modulating input signal, said converter including regulator means for acting on the total optical power delivered to said amplifier in response to a negative feedback signal representative of the extinction ratio of the output signal.

In a first possible solution, the negative feedback signal is the current modulation induced in the first amplifier.

In a second possible solution, the negative feedback signal is the radiofrequency power of the output optical signal.

A plurality of negative feedback application points are provided in embodiments that are described below.

The various embodiments include semiconductor optical amplifiers which can easily be integrated into the interferometer structure. In addition, these solutions are well suited to the component being connected in a cascade. The cost of manufacturing such components remains compatible with production forecasts.

The wavelength converter of the present invention is thus advantageously applicable to processing data in routing systems using wavelength-division multiplexing. It makes it possible to solve problems of conflict without the signal being adversely affected.

As appears from the remainder of the description, in addition to using the amplification effect supplied by the semiconductor amplifiers, use is also made of the fact that each of them has a refractive index that is a function both of the total optical power that it receives and also of the current injected into its active layer. It is thus easy to adjust the operating point of the interferometer structure.

BRIEF DESCRIPTION OF THE DRAWINGS

Other aspects and advantages of the present invention appear below from the description given by way of non-limiting example and with reference to the accompanying drawings, in which:

FIG. 1 is a diagram showing a Mach-Zehnder type interferometer structure;

FIG. 2 is a curve showing an input binary signal;

FIG. 3 is a diagram showing a first embodiment of a wavelength converter;

FIG. 4 is a diagram showing a second embodiment of a wavelength converter;

FIG. 5 is a diagram showing a third embodiment of a wavelength converter;

FIG. 6 is a diagram showing a fourth embodiment of a wavelength converter; and

FIGS. 7 and 8 are diagrams showing variant embodiments of interferometer structures enabling a wavelength converter of the invention to be made.

MORE DETAILED DESCRIPTION

In the remainder of the description, like elements are given like references.

The apparatus shown in FIG. 1 constitutes a prior art wavelength converter which operates as recalled below.

It includes an interferometer structure 1 made up of two guiding branches provided with respective semiconductor optical amplifiers OA1 and OA2. A first coupler K1 makes it possible to couple one end of each of the branches to a laser source 2 delivering an output carrier wave M of wavelength $\lambda_s$.

A second coupler K2 is disposed so as to enable the input signal E to be fed into the first amplifier OA1. A third coupler K3 connected to the coupler K2 and to the second amplifier OA2 is disposed so as to deliver an output signal S resulting from coupling auxiliary waves AM1 and AM2 delivered by respective ones of the amplifiers OA1 and OA2. The waves AM1 and AM2 correspond to the waves M1 and M2 output by the coupler K1 and amplified by respective ones of the amplifiers OA1 and OA2.

Currents I1 and I2 are injected into respective ones of the amplifiers OA1 and OA2. A first possibility is that the currents are adjusted so that the output signal S results from the waves AM1 and AM2 interfering constructively when the power of the input modulating signal E is low, and it results from them interfering destructively when said power is high.

FIG. 2 is a diagram showing how the optical power Pe of the input signal E varies over time. By way of example, a first data stream having high mean optical power is followed by a second data stream having lower mean optical power, and the high levels E1 and the low levels E0 of the signal E fluctuate widely.

The converters shown diagrammatically in FIGS. 3 and 4 have means for controlling the optical power of the output signal, which means are based on the same principle as that of measuring the modulation current induced in the semiconductor optical amplifier OA1 which receives the total optical power. This amplifier is used as a photodiode by injecting the input signal. The greater the injection, the greater the modulated current. By comparing it with a reference value that is considered to be optimal, an error signal is obtained that makes it possible to adjust a control parameter for controlling the converter.

Each of the converters shown in the figures thus includes an interferometer structure 1 as defined with reference to FIG. 1, and a regulator loop 3 between the semiconductor optical amplifier OA1 that receives the total optical power, and a point of application that makes it possible to act on said power so as to maintain an extinction ratio that is at a maximum.

The negative feedback is applied either to an amplifier OA3 placed at the inlet via which the modulating signal E is input (cf FIG. 3), or to the probe laser 2 (cf FIG. 4).

It may also be applied to a semiconductor optical amplifier placed between the laser and the coupler K1 (this solution is not shown).

In all of these solutions, the loop 3 makes it possible to detect the current induced in the semiconductor optical amplifier OA1, which current is an image of the input signal E. This current modulation is obtained at an outlet of the generator of the gain current Ig for the amplifier OA1, to which outlet a capacitor 10 is connected followed by an integrator 20 and a low-pass filter 30. The mean value of the modulation or the peak power is obtained at the output of this unit, and it is compared with a reference value by the comparator 40.

The reference value is predetermined to obtain an optimum converter operating point, i.e. an extinction ratio that is at a maximum.

In the embodiment shown in FIG. 3, when there is a difference between the two values applied to the inlet of the comparator 40, said comparator delivers an error signal e which is amplified at 50 and then applied to the generator of direct current Ig for the optical amplifier OA3, so as to correct its gain current, for example in order to modify the power of the input optical signal, thereby maintaining the extinction ratio at a maximum.

In the embodiment shown in FIG. 4, the modulation current of the semiconductor optical amplifier OA1 is also detected by means of the capacitor 10 connected to the generator of the gain current Ig for the amplifier, for the integrator 20, and for the low-pass filter 30. The mean value of this modulation or peak power obtained at the outlet of this unit is compared with a predetermined reference value. The comparator 40 generates an error signal e which is not zero when the two values that it receives at its inlets are different. After being amplified 50, the error signal is applied to the generator of the gain current Is for the probe laser so as to modify the power of the probe laser 2 which creates the optical wave onto which the information coming from the input optical signal E is transferred.

FIGS. 5 and 6 show wavelength converters of the invention that have control means for controlling the total optical power and that are based on a common principle that is different from the above-described principle. This principle is based on measuring the radiofrequency power of the optical signal at the outlet of the converter, i.e. the total power minus its DC component. This information is representative of the extinction ratio (it is at a maximum when the extinction ratio is at a maximum).

In both of these embodiments, an interferometer structure 1 is associated with a regulator loop 3 between the outlet which delivers the converted optical signal S and a point of application which makes it possible to modify the total optical power delivered to the amplifier OA1.

Thus, in these two embodiments, either at the inlet via which the modulating signal E is fed in, or at the inlet via which the probe signal M is fed in, a small amount of modulation is fed in at a frequency fm that is high enough for the converter to provide a rapid response, and that is low enough relative to the frequency of the modulation of the input signal E so as not to disturb said modulation. By way of example, this frequency fm is approximately in the range 5000 Hz to 50,000 Hz.

In FIG. 5, the modulation fm is applied by the modulator 100 via the semiconductor optical amplifier OA3. Advantageously, the modulation current Ifm is fed into the generator 140 of the gain current Ig for the amplifier OA3.

Synchronous detection is put in place by the loop 3. The signal from the converter in response to the modulation signal is compared with the injected signal.

For this purpose, by detecting the output signal S, the modulation spectrum line that has been created by the modulation fm is also detected. The output of the detection photodiode 110 is applied to the inlet of a band-pass filter 120 centered on the frequency fm.

The response modulation signal fm of the converter is obtained at the outlet of the filter.

By computing, in the circuit 130, the product of the modulation signal fm applied to the inlet via which the signal E is fed in multiplied by the response modulation signal fm of the converter in response to the small amount of modulation, it is possible to determine whether the signals are in phase or in antiphase.

When the converter is at its optimum operating point, i.e. when it has an extinction ratio that is at a maximum, the product of these modulations is zero.

Thus, when this product is not zero, this means that the output optical power is not constant, and that the operating point is no longer at its optimum.

The response of the converter is of the parabolic type, the optimum operating point being at the vertex of the parabola. When the converter is not operating with an optimum extinction ratio, the operating point moves rightwards or leftwards over the response curve from the vertex. The position of the operating point can be identified by the sign of the modulation product, which sign differs depending on whether the signals input into the multiplier 130 are in phase or in antiphase.

The outlet of the multiplier 130 delivers an error signal that makes it possible to modify the control parameter for controlling the power of the converter, namely, in this example, the gain current of the amplifier OA3. This signal is applied to the inlet of a low-pass filter 140 so as to retain only the modulation error signal fm. It is a direct current I whose sign and level depend on the quality of modulation. This error signal changes as a function of the modulation characteristics of the composite signal.

This error signal I is injected into the current generator 140, and, depending on its value, enables the current either to be reduced or to be increased.

FIG. 6 corresponds to a second variant embodiment corresponding to this coherent detection principle in which the point of application of the negative feedback is the probe laser 2. The error signal I makes it possible, in this case, to modify the control current Is for controlling the probe laser.

FIG. 7 shows a variant embodiment of the interferometer structure 1 to which the invention applies. The structure is also of the Mach-Zehnder type but the modulating signal E and the wave M are injected into the first amplifier OA1 in the same propagation direction. It operates similarly to the structure shown in FIG. 1 except that an output filter F' capable of removing the wavelength $\lambda_e$ effectively is placed at the outlet of the apparatus.

FIG. 8 shows a structure of the Michelson type equivalent to the preceding structure and to which the invention is applicable. In this variant, each of the two amplifiers OA1 and OA2 is coupled to the other via one of its ends only, the opposite end faces being provided with reflective coatings R1, R2. The modulating signal is injected into the first amplifier OA1 via the face R1, and the wave M is injected into both amplifiers OA1 and OA2 via the faces opposite from the faces R1 and R2 by means of a unit K1 formed by a circulator associated with a coupler. A first port of the circulator receives the wave M, the second port is coupled to both amplifiers OA1, OA2, and a third port delivers the output signal S.

We claim:

1. A wavelength converter including an interferometer structure for delivering an output optical signal, in which converter a first branch contains a first semiconductor optical amplifier and a second branch contains a second semiconductor optical amplifier, the amplifiers being coupled to a common probe laser, and said first amplifier being organized to receive a modulating input signal, said converter including regulator means for acting on the total optical power delivered to said amplifier in response to a negative feedback signal representative of the extinction ratio of the output signal.

2. A wavelength converter according to claim 1, wherein the negative feedback signal is the current modulation induced in the first amplifier.

3. A wavelength converter according to claim 1, wherein the negative feedback signal is the radiofrequency power of the output optical signal.

4. A wavelength converter according to claim 1, wherein the regulator means are suitable for adjusting the power of the input optical signal or of the probe laser.

5. A wavelength converter according to claim 1, wherein the regulator means include measurement means for measuring the current modulation induced in the first amplifier, comparator means for performing comparison with a reference signal and delivering an error signal, and control means for reacting to the error signal by controlling the input optical power of the laser.

6. A wavelength converter according to claim 5, wherein the control means are formed by an amplifier or attenuator, and by one of its control parameters, said amplifier or attenuator being placed upstream from the interferometer structure so as to receive the modulating input signal.

7. A wavelength converter according to claim 5, wherein the control means are formed by the probe laser and by its control current.

8. A wavelength converter according to claim 1, wherein the regulator means include injector means for injecting into the inlet of the converter a modulation signal for modulating predetermined characteristics so as not to disturb the input signal, detection means for detecting the corresponding output signal and comparator means for comparing the injected signal and suitable for generating an error signal, and control means for reacting to the error signal by controlling the input optical power or the power of the probe laser.

9. A wavelength converter according to claim 8, wherein the control means are formed by an amplifier or attenuator and by one of its control parameters, said amplifier or attenuator being placed upstream from the interferometer structure so as to receive the modulating input signal.

10. A wavelength converter according to claim 8, wherein the control means are formed by the probe laser and by its control current.

* * * * *